(12) United States Patent
Harrington (10) Patent No.: US 7,081,976 B2
(45) Date of Patent: Jul. 25, 2006

(54) COLOR CALIBRATION ALARM APPARATUS AND METHOD FOR USE IN AN IMAGE-RENDERING DEVICE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 815 days.

(21) Appl. No.: 09/725,837

(22) Filed: Nov. 29, 2000

(65) Prior Publication Data

US 2002/0063907 A1    May 30, 2002

(51) Int. Cl.
H04N 1/46    (2006.01)

(52) U.S. Cl. .................. 358/504; 358/1.6; 358/1.9; 382/112; 382/162; 382/167

(58) Field of Classification Search ............. 382/167, 382/162, 112, 4, 124; 358/1.15, 1.9, 1.6, 358/1.5, 504, 1.16
See application file for complete search history.

(56) References Cited

U.S. PATENT DOCUMENTS

| | | | | |
|---|---|---|---|---|
| 4,876,726 A * | 10/1989 | Capello et al. | ............. | 382/124 |
| 4,888,636 A | 12/1989 | Abe | ............. | 358/80 |
| 5,510,896 A | 4/1996 | Wafler | ............. | 358/296 |
| 5,737,665 A | 4/1998 | Sugiyama et al. | ............. | 399/39 |
| 5,764,386 A | 6/1998 | Robinson | ............. | 358/504 |
| 5,838,465 A | 11/1998 | Satou et al. | ............. | 358/520 |
| 5,877,787 A | 3/1999 | Edge | ............. | 347/19 |
| 5,884,118 A | 3/1999 | Mestha et al. | ............. | 399/15 |
| 6,008,907 A * | 12/1999 | Vigneau et al. | ............. | 358/1.9 |
| 6,205,244 B1 * | 3/2001 | Bawolek et al. | ............. | 382/162 |
| 6,275,600 B1 * | 8/2001 | Banker et al. | ............. | 382/112 |
| 6,320,980 B1 * | 11/2001 | Hidaka | ............. | 382/167 |
| 6,327,047 B1 * | 12/2001 | Motamed | ............. | 358/1.15 |
| 6,559,944 B1 * | 5/2003 | Van Aken et al. | ............. | 356/425 |
| 6,654,493 B1 * | 11/2003 | Hilliard et al. | ............. | 382/167 |
| 6,671,067 B1 * | 12/2003 | Adam et al. | ............. | 358/1.6 |

OTHER PUBLICATIONS

European Search Report.

* cited by examiner

Primary Examiner—Kimberly A. Williams
Assistant Examiner—Satwant Singh
(74) Attorney, Agent, or Firm—Fay, Sharpe, Fagan, Minnich & McKee, LLP (57) ABSTRACT

This invention relates to a color calibration alarm apparatus and method for use in an image-rendering device. The alarm apparatus, and associated method, make use of a sensor device that compares printed or measured color values with expected or ideal color values. With the measured values differ sufficiently from the ideal color values, the alarm apparatus signals to the user that a calibration should be performed. The printed or measured color values are obtained from a test patch that is printed, preferably, on a break page between print jobs. The alarm device is placed at the output tray of an image rendering device in one embodiment that may also be a separate stand alone hand-held unit in other embodiments where it is manually used.

18 Claims, 6 Drawing Sheets

COLOR CALIBRATION ALARM APPARATUS AND METHOD FOR USE IN AN IMAGE-RENDERING DEVICE

BACKGROUND OF THE INVENTION

This invention relates to a color calibration alarm apparatus and method for use in an image-rendering device. The alarm apparatus, and associated method, make use of a sensor device, a comparing device and a latching device to facilitate comparison of printed or measured color values with expected or ideal color values at an appropriate time. If the measured color values differ sufficiently from the ideal color values, the alarm apparatus signals to the user that a calibration should be performed. The printed or measured color values are obtained from a test patch that is printed, preferably, on a break page between print jobs. The alarm device is placed at the output tray of an image-rendering device but may also be implemented as a separate stand-alone hand-held unit.

While the invention is particularly directed to the art of color calibration alarms for use in image rendering devices, and will be thus described with specific reference thereto, it will be appreciated that the invention may have usefulness in other fields and applications. For example, the invention may be used in any image-rendering device where calibration of the system to achieve a desired output is required.

By way of background, many color calibration systems are known. Some of these known systems are simple and elegant while others are more involved and require special color measuring equipment. A common feature of these known techniques, however, is that such techniques typically require the user or other individual to decide the time at which the calibration should be carried out. The problem with this approach is that, if a user waits until the color prints are perceptively and obviously of insufficient quality, then there may well have been a number of other previous prints made of sub-optimal quality. On the other hand, if calibrations are conducted on a regular schedule, many of the calibrations may be unnecessary—thus wasting valuable resources.

It would therefore be desirable to have a reliable system for indicating a proper time in which to conduct a calibration. In this regard, it would be advantageous to have a color calibration alarm that only reports to the user that a color calibration is necessary as opposed to a system that also reports the color detected and/or conducts the calibration. In this way, such a system could be adapted for use in a variety of different printing environments.

The present invention contemplates a new and improved color calibration alarm for use with image rendering devices that resolves the above-referenced difficulties and others.

SUMMARY OF THE INVENTION

A color calibration alarm apparatus and method for use in an image-rendering device are provided.

In one aspect of the invention, the color calibration alarm includes a sensor device operative to detect colors of a test image to obtain at least one measured color value, a memory device having stored therein at least one ideal color value, a comparing device operative to compare the at least one measured color value to the at least one ideal color value, a latching device operative to selectively latch an output of the comparing device, and a display device operative to display the latched output.

In another aspect of the invention, a method comprises capturing ideal color, selectively rendering test images, generating a measure signal, detecting colors of at least one test color patch to obtain measured colored values, comparing the measured color values to the ideal color to obtain comparison results, combining the comparison results into an overall measurement, latching the overall measurement if the measure signal is present, and displaying the latched result.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIGS. 5(*a*) and (*b*) are block diagrams illustrating still other features of the present invention;

DETAILED DESCRIPTION OF THE PREFERRED EMBODIMENTS

Figure 1:
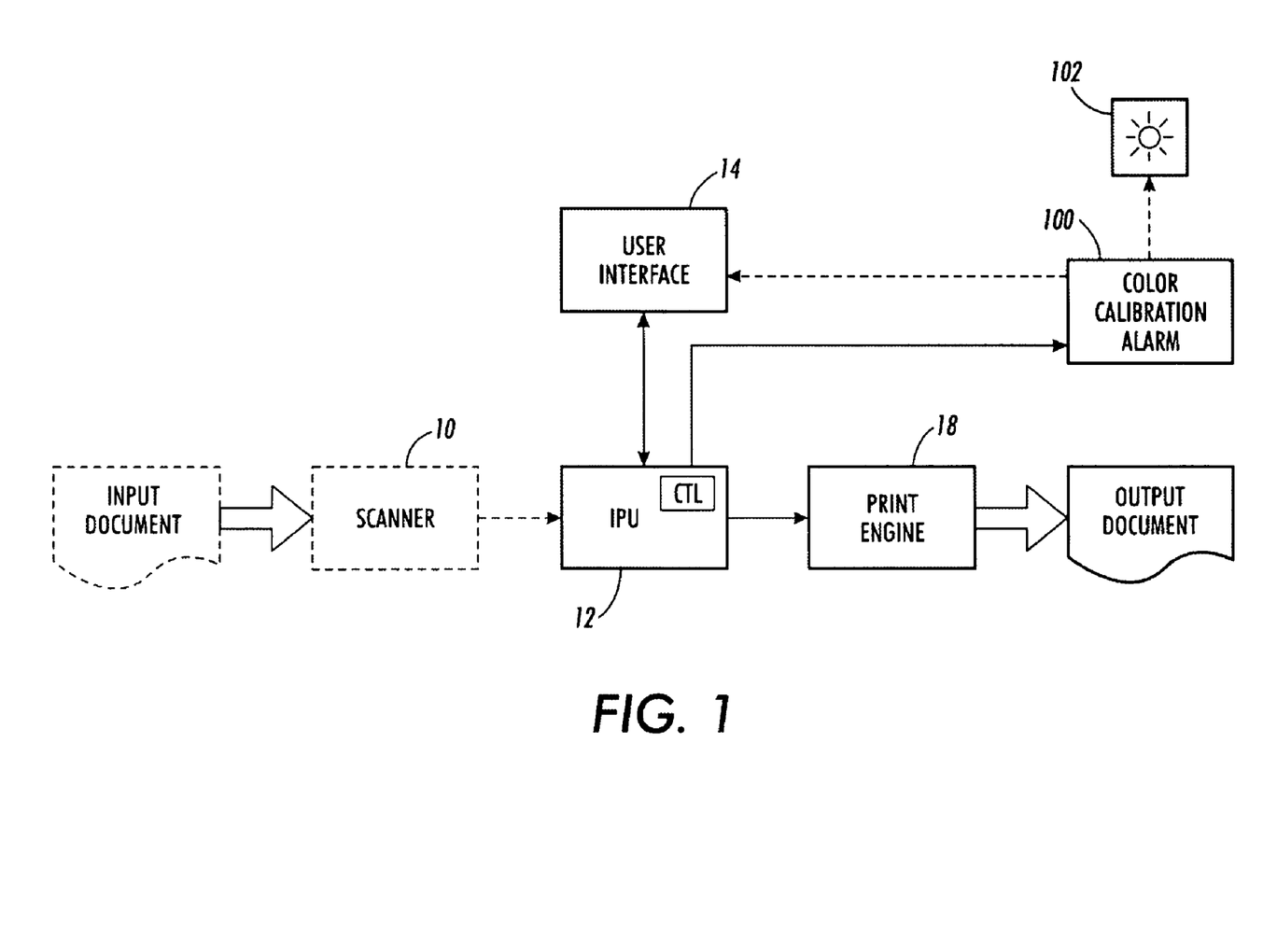
FIG. 1 is a block diagram of an image-rendering system incorporating the present invention.

Referring now to the drawings wherein the showings are for purposes of illustrating the preferred embodiments of the invention only and not for purposes of limiting same, FIG. 1 provides a view of an exemplary image-rendering system incorporating the present invention. As shown, such an exemplary system incorporating the present invention includes a scanner 10, an image processing unit (IPU) 12, a user interface 14 and a print engine 18. The IPU 12 has incorporated therein suitable print control structure. Also included in the system are a color calibration alarm device 100 and a display device 102.

It should be recognized that, in a copier or reproduction apparatus as shown, a document is input by scanning pages of the document by the scanner 10 and providing the scanned image(s) of the document to the image processing unit 12. The image processing unit 12 prepares the images of the input document for printing and provides appropriate data to the print engine 18. The print engine 18 then prints an output document. The color calibration alarm device subsequently makes use of sensors and compares printed or measured color values with expected or ideal color values. If the measured values differ sufficiently from the ideal color values, the alarm device 100 signals to the user through the display device 102, or through the user interface 14, that a calibration should be performed.

More particularly, the color calibration alarm device detects the colors of a test image such as a test color patch and compares those measured colors with the stored expected or ideal colors. The test color patch is preferably of a light gray color and suitably positioned on the page for detection. The test color patch could take any of a variety of configurations but preferably is of a form to facilitate convenient detection by the alarm device, such as the form of a rectangle. In addition, the test patch is also suitably located on the page to facilitate such convenient detection. In this regard, the test patch is preferably printed in the same location on every page upon which it is printed.

As will be appreciated, the alarm device only needs to be fully operative at specified times (i.e. when the test color patch is printed). As such, a measure signal is generated in the system to indicate to the alarm that the information detected and compared should be latched and displayed to the user to indicate whether a calibration is needed. The measure signal, as described below, could be provided based on different criteria that are embedded in the control structure of the system including upon the detection of a printed test pattern as a part of the test image that precedes the actual test patch to be analyzed. The printed test pattern contemplated could take a variety of forms but preferably takes the form of a recognizable bar code or sequence of colors in a convenient arrangement.

Figure 7:
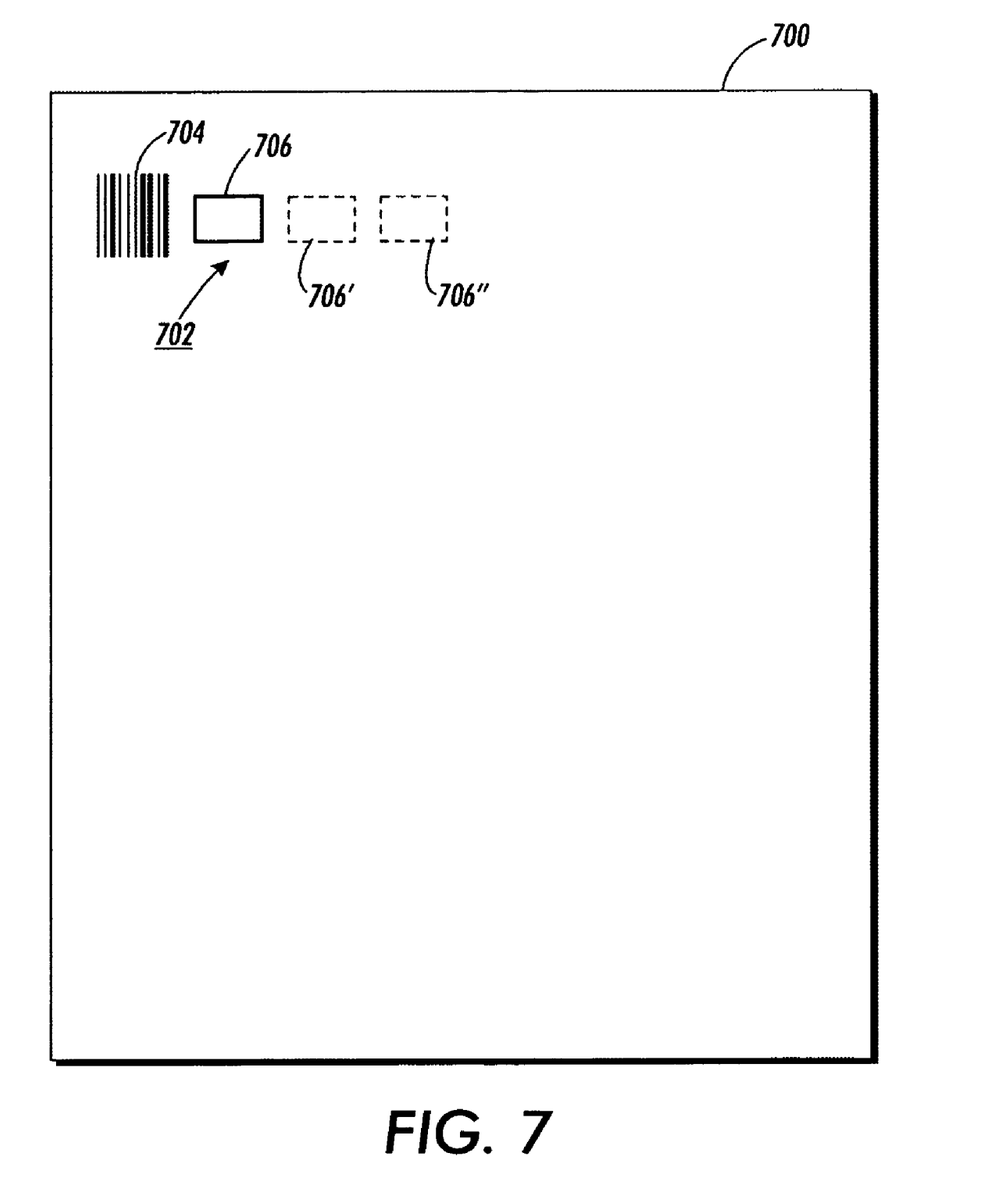

Referring now to FIG. 7, an exemplary printed page according to the present invention including a test image is shown. More particularly, the page 700 has a test image 702 printed thereon. The test image takes the form of a bar code test pattern 704 followed by a test color patch 706. It is to be appreciated that the illustrated test pattern is merely representative and the test color patch 706 would preferably be printed in gray (although not shown in gray). In addition, a variety of other color patches 706', 706", . . . etc. could be printed for purposes of detection and analysis to replace and/or supplement the gray test color patch.

The measure signal could also be provided upon the printing of a test color patch on break pages between print jobs, without the use of a test pattern. Further, the measure signal could be manually input to the system by the user.

As shown in FIG. 1, the color calibration alarm device is incorporated into an image rendering system. However, it should be appreciated that the device may also be implemented in the form of a hand-held or stand-alone device. In this case, it will be recognized by those skilled in the art that modifications to the alarm would be advantageously incorporated into such a device, as compared to an alarm that is incorporated within an image-rendering system.

For example, as will be described in more detail below, the calibration alarm device makes use of ideal color values that are captured after calibration of the image-rendering device. Where the alarm is incorporated into an image rendering device, the data is simply stored within the system for convenient access by the alarm device. However, if a hand-held or stand alone device is implemented, the ideal color value information would need to be communicated to the hand-held or stand alone device in some other manner, such as by measuring a color patch that has been identified by the user as the calibration standard.

The system shown in FIG. 1 is that of a copier or image reproduction system that uses a scanner. However, it is to be appreciated that the invention may also find usefulness in connection with printers. In those cases, a scanner would not be necessary as the image would be provided directly to the image processing unit. Moreover, the invention is preferably implemented in a xerographic printing environment wherein a xerographic print engine is utilized to render images in copying and/or printing applications. Still further, it is to be appreciated that the invention will find application in both digital and analog printing and/or reproduction/copying environments. In this regard, the environment described in connection with FIG. 2 is a digital reproduction environment utilizing an exemplary xerographic print engine; however, application of the invention is not so limited.

Figure 2:
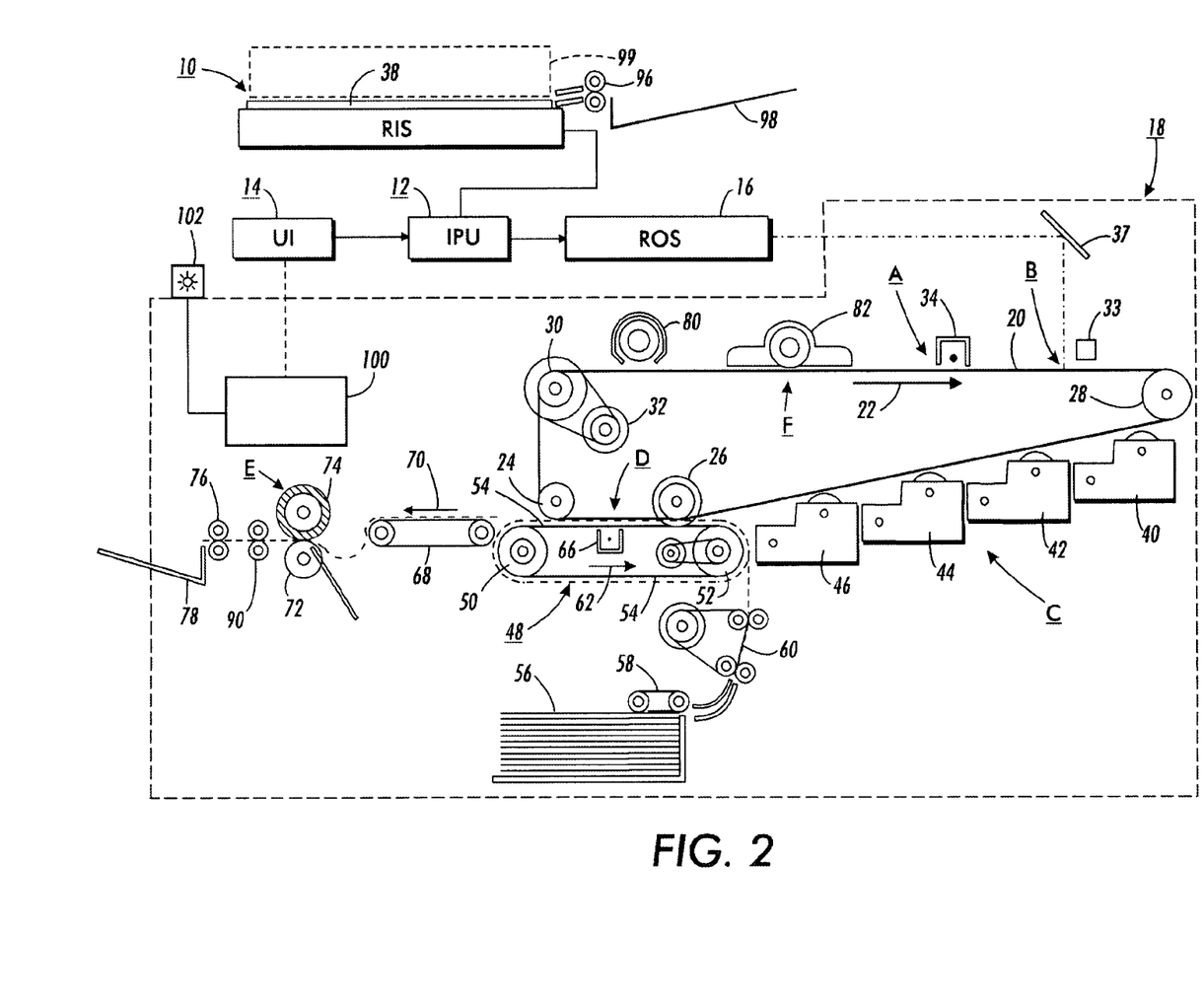
FIG. 2 is an illustration of a more specific embodiment of an image-rendering device incorporating the present invention.

In a more detailed example, a schematic elevational view showing an exemplary electrophotographic printing machine incorporating the features of the present invention therein is shown in FIG. 2. As alluded to above, it will become evident from the following discussion that the present invention is equally well-suited for use in a wide variety of printing systems including ionographic printing machines, ink jet printers, and discharge area development systems, as well as other more general non-printing systems providing multiple or variable outputs such that the invention is not necessarily limited in its application to the particular system shown herein.

Thus, by way of illustration only, a copying process to which the present application is applied will be described. However, it will be appreciated that the present invention may be applied and adapted for implementation in other environments. To initiate a copying process, a multicolor original document 38 is positioned on a raster input scanner (RIS), indicated generally by the reference numeral 10. The RIS 10 contains document illumination lamps, optics, a mechanical scanning drive, and a charge coupled device (CCD array) for capturing the entire image from original document 38. The RIS 10 converts the image to a series of raster scan lines and measures a set of primary color densities, such as red, green and blue densities, at each point of the original document. This information is transmitted as an electrical signal to an image processing unit (IPU), indicated generally by the reference numeral 12, which converts a set of density signals such as red, green and blue density signals to a set of calorimetric coordinates. The IPU contains control electronics for preparing and managing the image data flow to a raster output scanner (ROS), indicated generally by the reference numeral 16, in this embodiment. It is to be appreciated that, in some forms such as that shown in FIG. 1, the ROS or its equivalent functional equivalent is incorporated within the IPU.

A user interface (UI), indicated generally by the reference numeral 14, is provided for communicating with IPU 12. UI 14 enables an operator to control the various adjustable functions whereby the operator actuates the appropriate input keys of UI 14 to adjust the parameters of the copy. UI 14 may be a touch screen, or any other suitable device for providing an operator interface with the system. The output signal from UI 14 is transmitted to IPU 12 that then transmits signals corresponding to the desired image to ROS 16.

ROS 16 includes a laser with rotating polygon mirror blocks. The ROS 16 illuminates, via mirror 37, a charged portion of a photoconductive belt 20 of a print or marking engine, indicated generally by the reference numeral 18. Preferably, a multi-facet polygon mirror is used to illuminate the photoreceptor belt 20 at a rate of about 400 pixels per inch. The ROS 16 exposes the photoconductive belt 20 to record a set of three subtractive primary latent images thereon corresponding to the signals transmitted from IPU 12. One latent image is to be developed with cyan developer material, another latent image is to be developed with magenta developer material, and the third latent image is to be developed with yellow developer material. These developed images are subsequently transferred to a copy sheet in superimposed registration with one another to form a multicolored image on the copy sheet that is then fused thereto to form a color copy. This process will be discussed in greater detail below.

With continued reference to FIG. 2, marking engine 18 is an example of a xerographic print engine or electrophotographic printing machine comprising photoconductive belt 20 which is entrained about transfer rollers 24 and 26, tensioning roller 28, and drive roller 30. The drive roller 30 is rotated by a motor or other suitable mechanism coupled to the drive roller 30 by suitable means such as a belt drive 32. As roller 30 rotates, it advances photoconductive belt 20 in the direction of arrow 22 to sequentially advance successive portions of the photoconductive belt 20 through the various processing stations disposed about the path of movement thereof.

Photoconductive belt 20 is preferably made from a polychromatic photoconductive material comprising an anti-curl layer, a supporting substrate layer and an electrophotographic imaging single layer or multi-layers. The imaging layer may contain homogeneous, heterogeneous, inorganic or organic compositions. Preferably, finely divided particles of a photoconductive inorganic compound are dispersed in an electrically insulating organic resin binder. Typical photoconductive particles include a metal free phthalocyanine, such as copper phthalocyanine, quinacridones, 2, 4-diaminotriazines and polynuclear aromatic quinines. Typical organic resinous binders include polycarbonates, acrylate polymers, vinyl polymers, cellulose polymers, polyesters, polysiloxanes, polyamides, polyurethanes, epoxies, and the like.

Initially, a portion of photoconductive belt 20 passes through a charging station, indicated generally by the reference letter A. At charging station A, a corona generating device 34 or other charging device generates a charge voltage to charge photoconductive belt 20 to a relatively high, substantially uniform voltage potential. The corona generator 34 comprises a corona generating electrode, a shield partially enclosing the electrode, and a grid disposed between the belt 20 and the unenclosed portion of the electrode. The electrode charges the photoconductive surface of the belt 20 via corona discharge. The voltage potential applied to the photoconductive surface of the belt 20 is varied by controlling the voltage potential of the wire grid.

Next, the charged photoconductive surface is rotated to an exposure station, indicated generally by the reference letter B. Exposure station B receives a modulated light beam corresponding to information derived by RIS 10 having a multicolored original document 38 positioned thereat. The modulated light beam impinges on the surface of photoconductive belt 20, selectively illuminating the charged surface of photoconductive belt 20 to form an electrostatic latent image thereon. The photoconductive belt 20 is exposed three times to record three latent images representing each color.

After the electrostatic latent images have been recorded on photoconductive belt 20, the belt is advanced toward a development station, indicated generally by the reference letter C. However, before reaching the development station C, the photoconductive belt 20 passes subjacent to a voltage monitor, preferably an electrostatic voltmeter 33, for measurement of the voltage potential at the surface of the photoconductive belt 20. The electrostatic voltmeter 33 can be any suitable type known in the art wherein the charge on the photoconductive surface of the belt 20 is sensed, such as disclosed in U.S. Pat. Nos. 3,870,968; 4,205,257; or 4,853,639, the contents of which are incorporated by reference herein.

A typical electrostatic voltmeter is controlled by a switching arrangement which provides the measuring condition in which charge is induced on a probe electrode corresponding to the sensed voltage level of the belt 20. The induced charge is proportional to the sum of the internal capacitance of the probe and its associated circuitry, relative to the probe-to-measured surface capacitance. A DC measurement circuit is combined with the electrostatic voltmeter circuit for providing an output which can be read by a conventional test meter or input to a control circuit. The voltage potential measurement of the photoconductive belt 20 is utilized to determine specific parameters for maintaining a predetermined potential on the photoreceptor surface.

The development station C includes four individual developer units indicated by reference numerals 40, 42, 44 and 46. The developer units are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface.

Developer units 40, 42, and 44, respectively, apply toner particles of a specific color corresponding to the compliment of the specific color separated electrostatic latent image recorded on the photoconductive surface. Each of the toner particle colors is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document.

In FIG. 2, developer unit 40 is shown in the operative position with developer units 42, 44 and 46 being in the non-operative position. During development of each electrostatic latent image, only one developer unit is in the operative position, while the remaining developer units are in the non-operative position. Each of the developer units is moved into and out of a position. In the operative position, the magnetic brush is positioned substantially adjacent the photoconductive belt, while in the non-operative position, the magnetic brush is spaced therefrom. Thus, each electrostatic latent image or panel is developed with toner particles of the appropriate color without commingling.

After development, the toner image is moved to a transfer station, indicated generally by the reference letter D. Transfer station D includes a transfer zone, defining the position at which the toner image is transferred to a sheet of support material, which may be a sheet of plain paper or any other suitable support substrate. A sheet transport apparatus, indicated generally by the reference numeral 48, moves the sheet into contact with photoconductive belt 20. Sheet transport 48 has a belt 54 entrained about a pair of substantially cylindrical rollers 50 and 52. A friction retard feeder 58 advances the uppermost sheet from stack 56 onto a pretransfer transport 60 for advancing a sheet to sheet transport 48 in synchronism with the movement thereof so that the leading edge of the sheet arrives at a preselected position, i.e. a loading zone. The sheet is received by the sheet transport 48 for movement therewith in a recirculating path. As belt 54 of transport 48 moves in the direction of arrow 62, the sheet is moved into contact with the photoconductive belt 20, in synchronism with the toner image developed thereon.

In the transfer zone, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this manner, three different color toner images are transferred to the sheet in superimposed registration with one another. Each of the electrostatic latent images recorded on the photoconductive surface is developed with the appropriately colored toner and transferred, in superimposed registration with one another, to the sheet for forming the multi-color copy of the colored original document. One skilled in the art will appreciate that the sheet may move in a recirculating path for four cycles when undercolor black removal is used.

After the last transfer operation, the sheet transport system directs the sheet to a vacuum conveyor, indicated generally by the reference numeral 68. Vacuum conveyor 68 transports the sheet, in the direction of arrow 70, to a fusing station, indicated generally by the reference letter E, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The last processing station in the direction of movement of belt 20, as indicated by arrow 22, is a cleaning station, indicated generally by the reference letter F. A lamp 80 illuminates the surface of photoconductive belt 20 to remove any residual charge remaining thereon. Thereafter, a rotatably mounted fibrous brush 82 is positioned in the cleaning station and maintained in contact with photoconductive belt 20 to remove residual toner particles remaining from the transfer operation prior to the start of the next successive imaging cycle.

In addition, as shown, a color calibration alarm device 100 is shown to be positioned near the output of the image-rendering device. In this exemplary embodiment, the alarm device 100 is connected to the image processing unit 12, the user interface 14 and the display 102.

Figure 3:
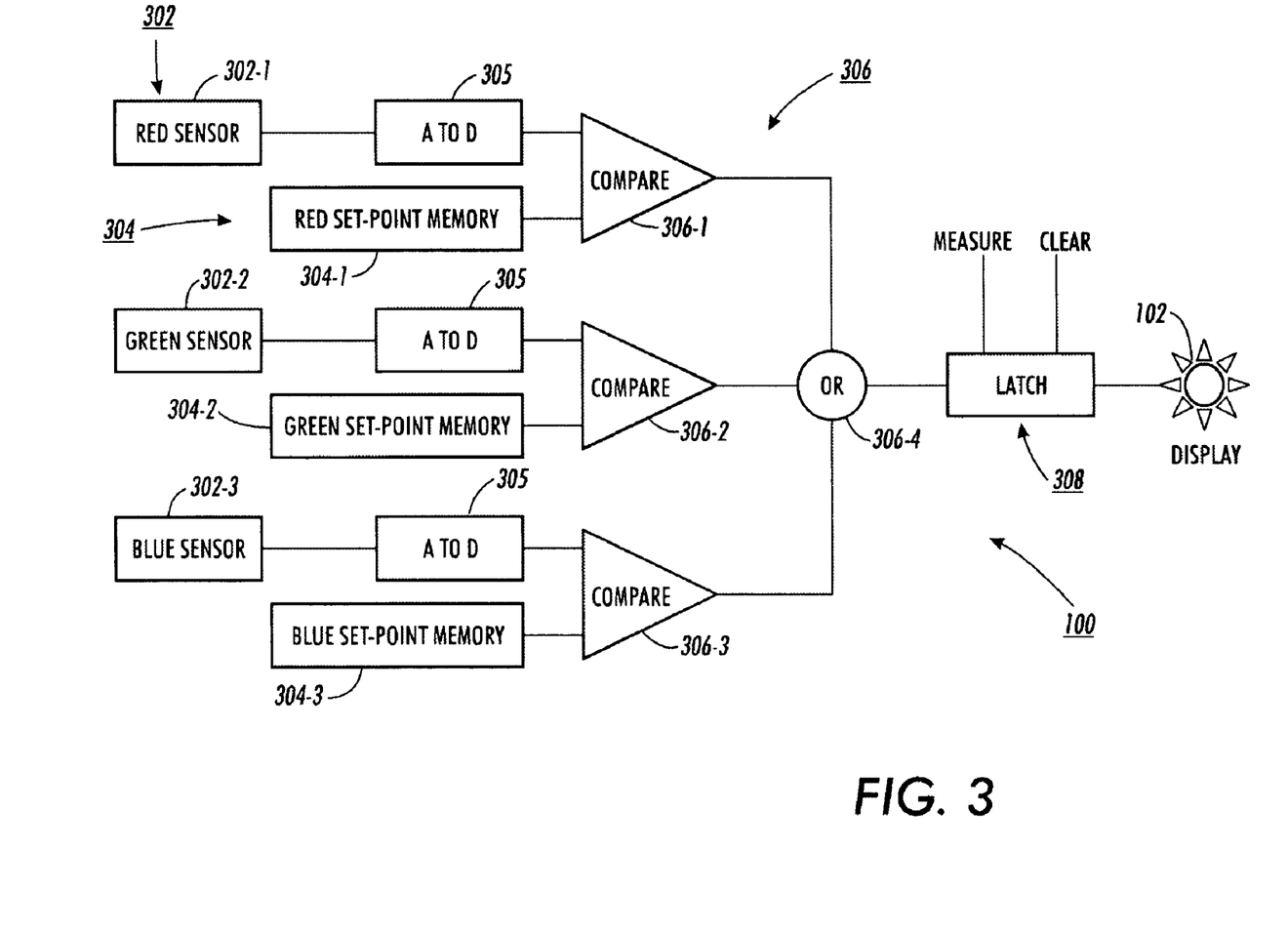
FIG. 3 is a block diagram of a calibration alarm according to the present invention.

More particularly, with reference to FIG. 3, the color calibration alarm device 100 includes a sensor device 302, a memory device 304, a comparing device 306, a latching device 308, and a display device 102. As implemented, the sensor device 302 preferably comprises a plurality of sensors. These include a red sensor 302-1, a green sensor 302-2, and a blue sensor 302-3. As to the sensors themselves, any suitable form of sensor that accomplishes the objectives of the present invention could be used. More particularly, a simple sensor configuration that has the capability to sense three color component measurements will suffice. The sensors could include light emitting diodes (LEDs) and associated photocells that cooperate to detect light reflected from the test color patches used to implement the invention, as is well known in the art. Suitable and appropriately positioned filters may also be advantageously used to distinguish the various colors of light.

Likewise, the memory device comprises a plurality of set point memories. Included in the plurality are a red set point memory 304-1, a green set point memory 304-2, and a blue set point memory 304-3. These memories may take a variety of forms but preferably store sufficient color information so that a suitable comparison between the stored color and the measured color as detected by the sensors may be accomplished. The contents of each of the set point memories include digital representations of a single color value or a range of color values, the capturing of which will be described in greater detail in connection with FIG. 5 below.

In the preferred form, the output of each sensor is connected to an analog to digital converter 305 and then fed to a digital comparator. The comparator 306-1 is connected to the converted output of the red sensor as well as the red set point memory. The comparator 306-2 is connected to the converted output of green sensor 302-2 as well as green set point memory 304-2. Last, the comparator 306-3 is connected to the converted output of blue sensor 302-3, as well as the output of blue set point memory 304-3. The comparators and any associated hardware and software may take any suitable form to accomplish the objectives of the invention.

With respect to comparisons that are accomplished within the system, it should be recognized that the ideal, or setpoint, values stored in the memories are preferably stored in digital format. Therefore, a range or plurality of acceptable ideal color values may be stored and suitably compared to the measured color value. In the case of storing of a range of color values as opposed to simply storing a plurality of color values, comparisons may be accomplished by determining if the measured color value falls between a stored upper limit and stored lower limit (e.g. determining if the measured value is less than the upper limit and if the measured value is greater than the lower limit). As an alternative, the desired range can be realized by storing a single captured color value and specifying the acceptable limits on the desired range relative to that value, e.g., plus (+) or minus (−) 3. If either type of range storage is used, the comparator preferably includes or has associated therewith suitable mechanisms and/or modules to conduct any necessary arithmetic computations. As an alternative to storing a range or a plurality of values, a single ideal color value can be stored and comparisons can be accomplished by only using the most significant bits of the ideal single color value and the measured single color value being compared. The impact of comparing the most significant bits is that an effective range of colors, although somewhat limited due to the nature of truncation, is compared without storing such a range and without implementing an iterative process.

In the preferred embodiment, the digital outputs of each of the digital comparators are supplied to an OR gate 306-4. Such digital outputs, notwithstanding the manner in which the comparisons are accomplished, preferably indicate whether or not the measured value is sufficiently close to the ideal color value or values stored in the set-point memories.

It should be appreciated also that an alternative form of the invention includes use of an analog comparator, thus necessitating the removal of the analog to digital converters 305 and the addition of digital to analog converters at the output of the memories 304-1, 304-2, and 304-3. In the analog case, the sensors feed analog outputs directly to an analog comparator. The digital representation of the color values stored in the set-point memories is then converted to an analog form by the digital to analog converters and also provided to the analog comparator. The output of the comparator is, consequently, a difference between two analog signals. If the difference is within an acceptable range, then no signal is provided for calibration. If, however, the difference is outside of an acceptable range, then calibration would be required. Threshold devices are preferably employed to accomplish these determinations.

In either the digital or analog environments, the output of the OR gate 306-4 is provided to the latch 308 which is connected to the display device 102. Alternatively, the output of the latch could be supplied to the UI for display to the user. The latch 308 is also provided with a measure signal and a clear signal. In this regard, the latch is operative to latch the information provided from the OR gate when the measure signal is present. The measure signal is provided to the latch in ways that are more particularly described below. Of course, the clear signal is preferably manually provided by the user at such time as the information in the latch is no longer useful for operation of the device.

Figure 4:
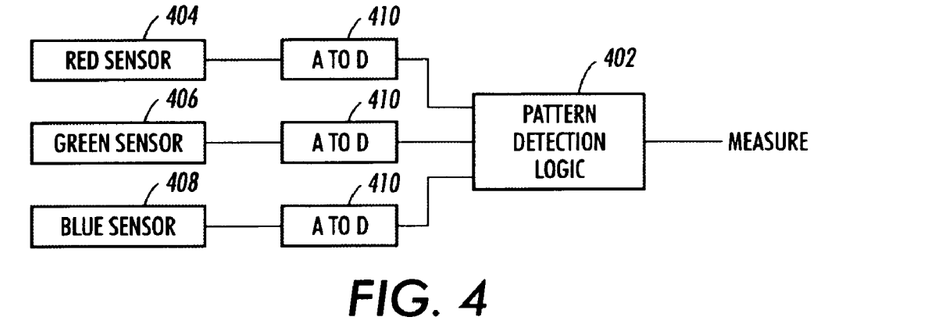
FIG. 4 is a block diagram illustrating another feature of the present invention.

Referring now to FIG. 4, a preferred manner in which to provide a measure signal to the latch 308 is shown. A pattern detection logic module 402 is provided with converted outputs of various sensors so that the measure signal is only provided upon detection of a particular pattern, either bar code or color pattern. More specifically, a red sensor 404, a green sensor 406, and a blue sensor 408 all have outputs that are connected to analog to digital converters 410. The converted outputs are then provided to the pattern detection logic module 402. The pattern detection logic module generates a measure signal to be provided to the latch shown in FIG. 3 if the outputs of the sensors indicate that a predetermined pattern is detected. It should be recognized that the sensors 404, 406 and 408 may be of the same or different form as the sensors illustrated in FIG. 3. In some embodiments, it may be advantageous to utilize the same set of sensors for both the purposes of FIG. 3 and FIG. 4 to reduce hardware requirements for the system.

Alternatively, the measure signal may simply be provided at the command of the system upon the printing of a break page. Of course, this type of system would also preferably print the test color patch on the break page at an appropriate position for detection. In the case of a hand-held color calibration alarm, the measure signal could simply be manually provided by the user at the time when the user desires to have a printed test patch analyzed.

Figure 5A:
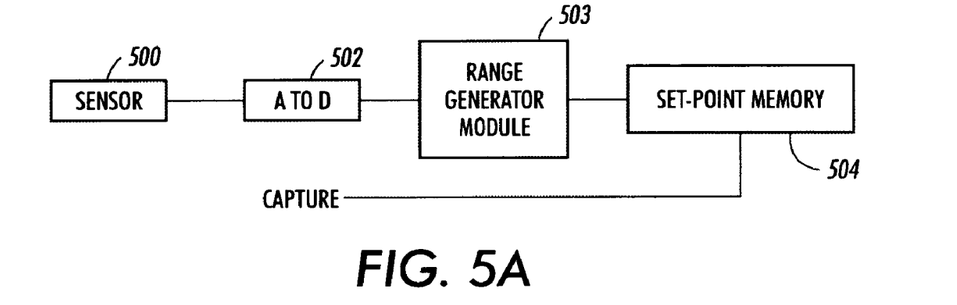

Referring now to FIG. 5(*a*), a preferred configuration for capturing ideal color values in each set point memory is shown. The capturing of ideal color values, or set points, can be accomplished by detecting sensor values for a test color patch just after calibration is carried out. To accomplish this, as shown, a sensor 500 detects a color in analog form that is then provided to an analog to digital converter 502. The digital output of the converter is then preferably provided to a range generator module 503, which then provides the range information generated therein to the set point memory 504 (which could be any of the set-point memories illustrated in FIG. 3) for storage. For example, the range generator module 503 adds a predetermined incremental value to the captured color value to obtain an upper limit on the desired range and subtracts a predetermined incremental value from the captured color value to obtain the lower limit on the desired range. The upper and lower limits are then provided to the set point memory. As referenced below, the comparisons can then be accomplished using this information. To accommodate the above referenced option of storing all values of a range, a more rudimentary process involves the actual calculation of all such values in the desired range by the range generator module 503, which values are then provided to the set point memory.

Figure 5B:
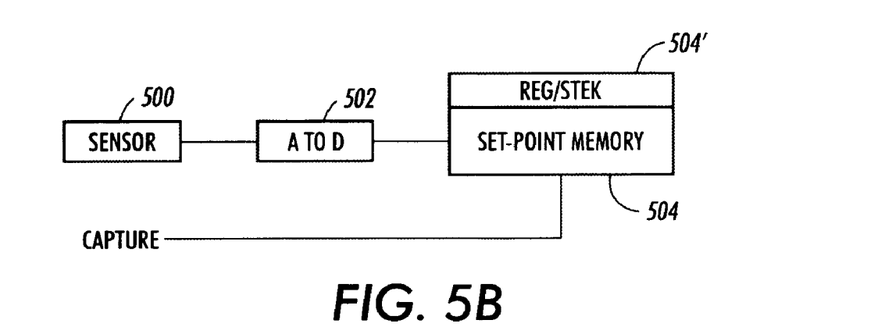

As an alternative to the range generator module 503, as shown in FIG. 5(*b*), the captured value could simply be directly stored in the set point memory 504 and the incremental values could be stored either separately in a register module 504' within the set point memory or elsewhere in the system. With this stored information, the comparator, or its associated arithmetic modules/mechanisms, calculates the range of acceptable color values each time a comparison process is conducted.

Of course, if only a single captured color value is stored, there is no need to generate range information. In this case, the embodiment illustrated in FIG. 5(*b*), modified to exclude the incremental value storage register, could be implemented. As such, the captured color value is stored directly in the set point memory.

Of course, this technique of capturing color is used only when a capture signal is generated and provided to the set point memory. The capture signal is preferably provided by the image processing unit at the instruction of the user. It should also be recognized that the sensor 500 may be of the same or different form as the sensors illustrated in FIGS. 3 and 4. In some embodiments, it may be advantageous to utilize the same set of sensors for the purposes of FIGS. 3, 4 and 5 to reduce hardware requirements for the system.

Figure 6:
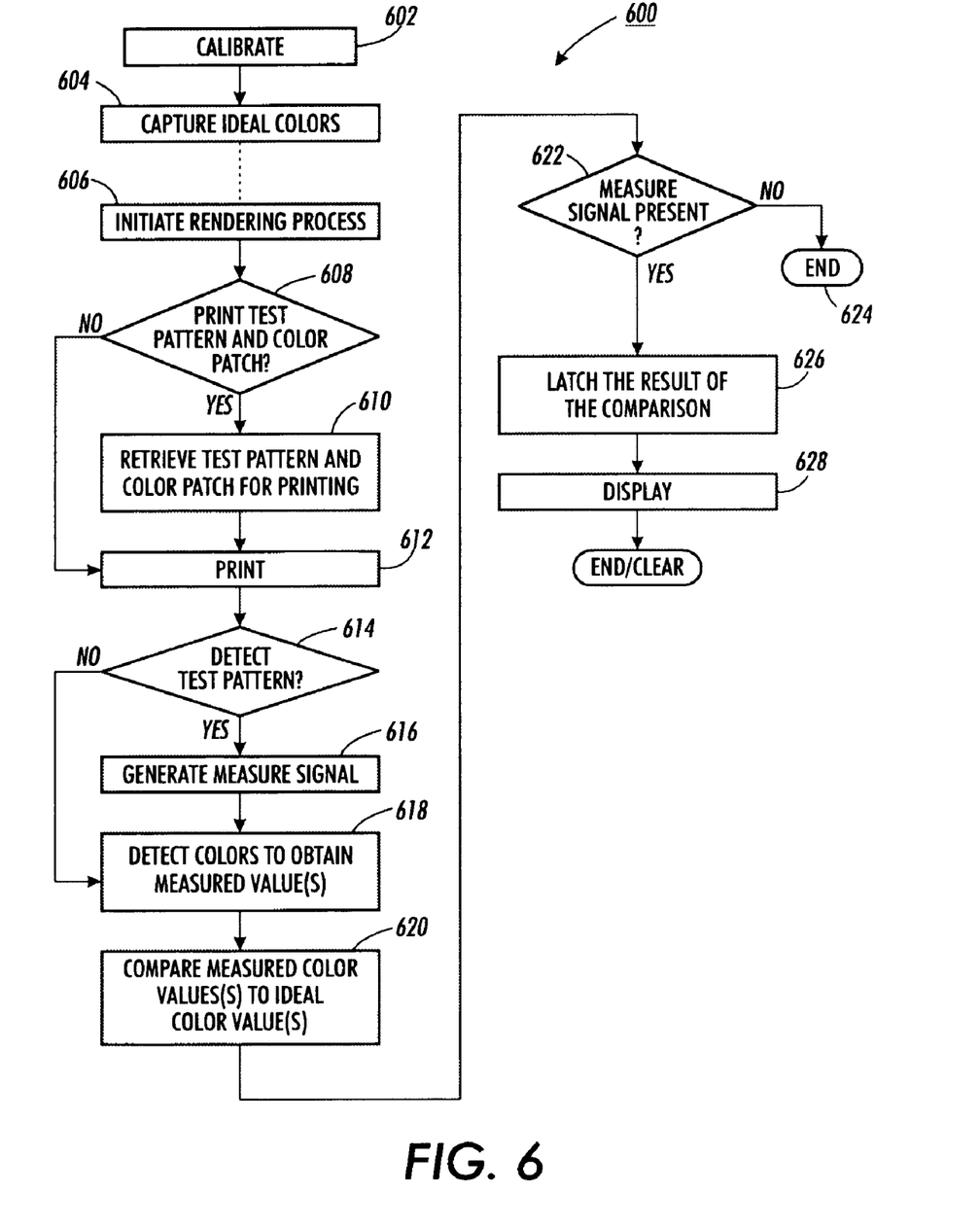
FIG. 6 is a flow chart illustrating a method according to the present invention; and, FIG. 7 is an example of a printed page including a test image according to the present invention.

Referring now to FIG. 6, an exemplary method according to the present invention is shown. Initially, the image rendering device is calibrated (step 602). Then, ideal color values, or set points, are captured (and stored as values or ranges) by the device for each of the red, green and blue memories as shown and described in connection with FIGS. 5(*a*) and (*b*) (step 604). Once these steps are accomplished, the system is now ready for rendering images.

In this regard, at an appropriate time, a rendering process is initiated (step 606). For each page printed, it is determined whether a test pattern and color patch should be printed on the page (step 608). This determination is based on the control parameters that are set in the system. For example, a test pattern and at least one color patch may be printed on the break page of each print job. In that case, the determination in step 608 would depend on whether a break page was being printed or not. If a test pattern and color patch(es) are to be printed on the page, the test pattern and color patch(es) are retrieved from an appropriate storage location within the system (step 610) for the printing process. Whether or not the test pattern or color patch(es) are to be printed, the page is printed (step 612). The page then passes by the color calibration alarm and a determination is made as to whether a test pattern was detected by the alarm device (step 614). If so, a measure signal is generated (step 616). Whether or not a test pattern is detected, the sensors also detect the colors on the page that are passing by the sensors (step 618). At this point, a comparison between the measured color values and the ideal color values that were captured in step 604 is made (step 620). A determination is then made as to whether a measure signal is present (step 622). If not, the process is ended (step 624). If, however, the measure signal is present, the result of the comparison of the test color patch(es) and the ideal color values in step 620 is latched (step 626). Then, the contents of the latch are displayed (step 628).

The user consequently has an indication from the system as to whether calibration needs to be conducted. In this regard, if the measured color values detected by the color calibration alarm are not sufficiently close to the ideal color values, then calibration is required. This is indicated to the user through the user interface or simply by the lighting of an LED on the image-rendering device. If, however, the measured color values are within an acceptable range of the ideal color values, then no calibration is needed. This, too, can be indicated to the user via the user interface or by simply not lighting the LED.

It should be recognized that the method described in connection with FIG. 6 will vary slightly depending upon the precise configuration and operation of the system into which the present invention is implemented. For example, for a copier device, the test pattern and color test patch could be generated by copying an image containing the test pattern and ideal color test patch. Or, if no test pattern is printed, then the steps involving generation and detection of the test pattern are not required. The measure signal could alternatively be generated when the system prints a test patch or when the system processes a break page including the test patch. Also, the measure signal may be generated by a variety of different sources, although the preferred source is the control structure of the IPU. This may affect the precise steps of the method. In addition, those skilled in the art will appreciate that the method could be impacted if the color calibration alarm device 100 is implemented in a hand-held or stand alone type unit.

It will also be understood by those of skill in the art that the invention described herein may be implemented using suitable hardware and software techniques. However, such hardware and software techniques may vary depending on the environment of use and implementation requirements for a given system.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A color calibration alarm apparatus useful in an image rendering device, the apparatus comprising:
   a pattern detection logic module operative to generate a measure signal upon detection of a test pattern;
   a sensor device operative to detect color of a test image to obtain at least one measured color value;
   a memory device having stored therein at least one ideal color value;
   a comparing device operative to compare the at least one measured color value to the at least one ideal color value;
   a latching device operative to selectively latch an output of the comparing device when the measure signal is present; and,
   a display device operative to display the latched output.

2. The apparatus as set forth in claim 1 wherein the sensor device comprises a plurality of sensors, each corresponding to a separate color.

3. The apparatus as set forth in claim 1 wherein the memory device comprises a plurality of set point memory modules, each module having stored therein one of a separate ideal color value and a range of the separate ideal color values.

4. The apparatus as set forth in claim 1 wherein the comparing device comprises a plurality of comparators, outputs of which are input to combining logic.

5. The apparatus as set forth in claim 4 wherein the combining logic is an OR gate.

6. The apparatus as set forth in claim 1 wherein the pattern detection logic module has sensors connected thereto which are operative to detect the test pattern.

7. The apparatus as set forth in claim 1 wherein the at least one ideal color value is selectively captured.

8. The apparatus as set forth in claim 1 further comprising a sensor operative to selectively capture the at least one ideal color value based on a capture signal generated by the image rendering device after the image rendering device is calibrated.

9. A method for use in an image rendering device for rendering color images, the method comprising steps of:
   capturing ideal color;
   selectively rendering test images;
   generating a measure signal;
   detecting colors of at least one test color patch in the test image to obtain measured color values;
   comparing the measured color values to the ideal color to obtain comparison results;
   combining the comparison results into an overall measurement;
   latching the overall measurement if the measure signal is present; and,
   displaying the latched result.

10. A method for use in an image rendering device for rendering color images, the method comprising steps of:
    capturing ideal color;
    selectively rendering test images;
    generating a measure signal;
    detecting colors of at least one test color patch in the test image to obtain measured color values the test color patches being rendered on break pages between jobs
    comparing the measured color values to the ideal color to obtain comparison results;
    combining the comparison results into an overall measurement;
    latching the overall measurement if the measure signal is present; and,
    displaying the latched result.

11. The method as set forth in claim 9 further comprising the generating of a test pattern comprising one of a bar code and a predetermined sequence of colors.

12. The method as set forth in claim 9 wherein the ideal color values are obtained by:
    calibrating the device; and
    measuring the values of colors produced by the calibrated device.

13. The method as set forth in claim 9 wherein the test images comprise a detectable test pattern and test color patches.

14. The method as set forth in claim 9 wherein the generation of the measure signal is based on the identification of a test image.

15. The method as set forth in claim 14 wherein the identification of a test image is carried out by detecting a test pattern contained within the said test image.

16. The method as set forth in claim 15 wherein the color test patch to be measured is contained within the test image and is associated with the detected test pattern.

17. A system for use in an image rendering device for rendering color images, the system comprising:
   means for capturing ideal color;
   means for selectively rendering test images;
   means for generating a measure signal;
   means for detecting colors of at least one test color patch in the test image to obtain measured color values;
   means for comparing the measured color values to the ideal color to obtain comparison results;
   means for combining the comparison results into an overall measurement;
   means for latching the overall measurement if the measure signal is present; and,
   means for displaying the latched result.

18. The system as set forth in claim 17 wherein the test images are composed of a detectable test patterns and test color patches.

* * * * *